May 9, 1961     L. Z. POKORNY     2,983,157
VARIABLE DIAMETER PULLEY

Filed Oct. 3, 1958     2 Sheets-Sheet 1

INVENTOR.
*Laszlo Z. Pokorny*
BY
*M. H. Strickland*
His Attorney

United States Patent Office 2,983,157
Patented May 9, 1961

2,983,157
VARIABLE DIAMETER PULLEY

Laszlo Z. Pokorny, Rochester, N.Y., assignor to General Motors Corporation, Detroit, Mich., a corporation of Delaware Filed Oct. 3, 1958, Ser. No. 765,090

10 Claims. (Cl. 74—230.17)

This invention pertains to pulleys, and particularly to a thermally responsive variable diameter pulley assembly.

Heretofore, various pulley constructions have been designed wherein the diameter of the pulley is controlled by temperature responsive means. However, prior temperature responsive variable diameter pulley assemblies are defective in that no means are provided for accommodating movement of the temperature responsive means after the pulley diameter has been increased to a maximum, that is, when the two pulley halves are in abutting relationship. The present invention relates to a unique double bellows type temperature responsive means for varying the diameter of a pulley in combination with overload protection means which permit continuing expansion of the temperature responsive means even though the pulley halves are fully closed. Accordingly, among my objects are the provision of a temperature controlled variable diameter pulley assembly; the further provision of a variable diameter pulley assembly including a pair of expansible and contractible bellows containing a thermostatic liquid; and the still further provision of a variable diameter pulley assembly including temperature responsive means for controlling the diameter thereof and resilient means for accommodating continued expansion of the thermostatic fluid when the pulley halves are fully closed.

The aforementioned and other objects are accomplished in the present invention by utilizing a pair of flexible metallic bellows of different diameter arranged so that during opening or closing movement of the pulley halves, one of the bellows is expanded and the other bellows is collapsed. Specifically, the improved variable diameter pulley assembly of this invention includes a hub to which a fixed pulley half is attached. The fixed pulley half and the hub are adapted for driving connection to a rotating power shaft. The fixed pulley half has a cup-shaped recess which slidably receives the hub portion of the movable pulley half. The movable pulley half is in the form of a drum, the inner wall of which is constituted by a pair of flexible metallic bellows of different diameter.

The outer end of the larger diameter bellows is attached to the end wall of the drum opposite the pulley half, and the inner end is attached to an annulus which is spring biased into engagement with a shoulder on the hub. The inner end of the smaller diameter bellows is operatively connected with the annulus, and the outer end is connected with a plate closing the hollow hub portion of the movable pulley half. The drum is slidably mounted by means of a ring on a flanged member attached to the pulley hub, a compression spring being interposed between the fixed flanged member and the annulus to which the ends of both bellows are operatively connected.

The drum may be partially circumscribed by a flanged annulus which carries an electric heating element disposed in contiguous relation to the drum. Energization of the heating element can be controlled by any suitable mechanism so as to control the diameter of the pulley assembly.

In operation, a V-belt is received between the pulley halves, the V-belt being suitably tensioned so as to normally urge the pulley halves apart to maintain a minimum pulley diameter. The drum contains thermostatic liquid having a known coefficient of thermal expansion, and upon heating of the thermostatic liquid the movable pulley half is adjusted to increase the pulley diameter by collapsing the larger diameter bellows and expanding the smaller diameter bellows. Conversely, upon cooling, the tensioned belt will force the pulley halves apart so as to reduce the pulley diameter. When the pulley halves are fully closed, that is, when the pulley diameter is a maximum, if the thermostatic fluid should continue to expand due to additional heat, the smaller diameter bellows continues to expand while the larger diameter bellows is collapsed, expansion of the smaller diameter bellows reacting against the overload spring thereby preventing damage to the temperature responsive means when the pulley halves are fully closed.

Further objects and advantages of the present invention will be apparent from the following description, reference being had to the accompanying drawings, wherein a preferred embodiment of the present invention is clearly shown.

Figure 1:
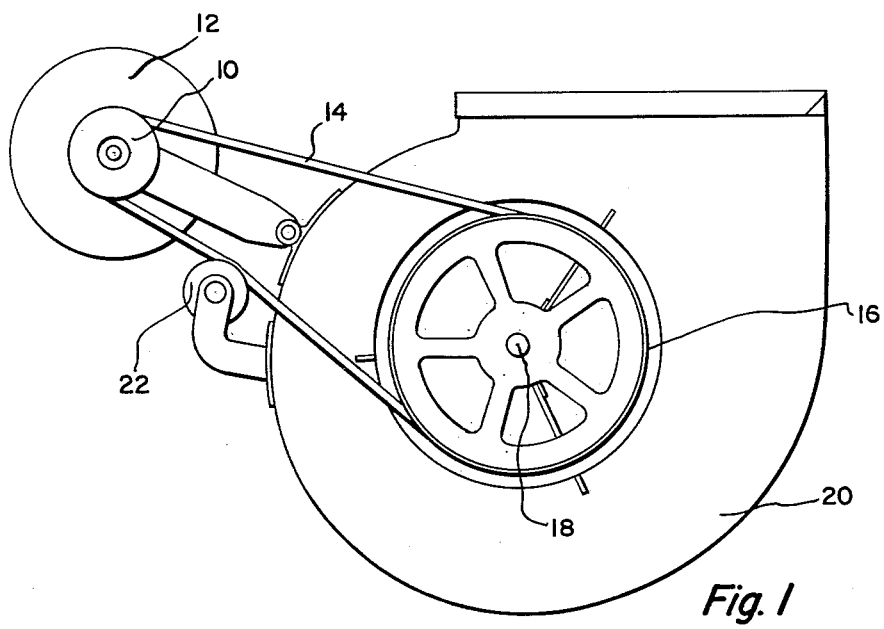
Figure 1 is a view in elevation of a motor driven centrifugal blower including the variable diameter pulley assembly of this invention.

With particular reference to Figure 1, the variable diameter pulley assembly is indicated generally by the numeral 10, this pulley assembly being associated with a centrifugal blower drive. The centrifugal blower drive includes an electric motor 12, a V-belt 14, a driven pulley 16 having a shaft 18 to which a blower wheel disposed within the volute casing 20 is attached, and a spring biased idler pulley 22 which maintains the requisite tautness in the V-belt 14.

Figure 2:
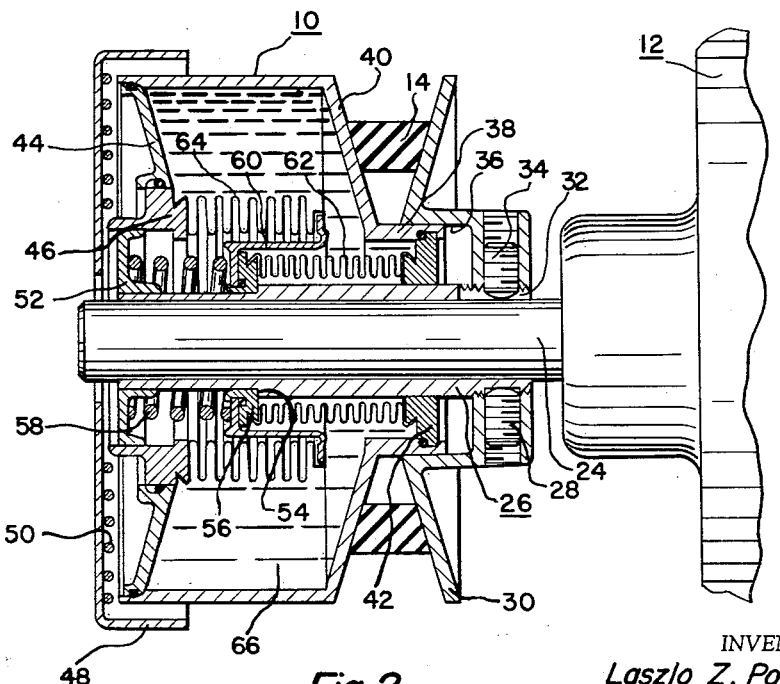
Figure 2 is a fragmentary view, partly in section and partly in elevation, illustrating the variable diameter pulley assembly of this invention in the substantially fully open position.

With reference to Figure 2, the motor 12 has a drive shaft 24 extending axially therefrom upon which the variable diameter pulley assembly 10 is supported. The pulley assembly 10 includes a hollow hub 26 through which the shaft 24 extends, the hub 26 being attached by means of a set screw 28 to a fixed pulley half 30. The hub 26 is formed with a key-way slot 32 through which a second set screw 34 carried by the pulley half 30 extends for drivingly connecting the hub 26 and the pulley half 30 with the shaft 24.

The pulley half 30 is formed with a cup-shaped recess 36 within which a hub portion 38 of a movable pulley half 40 in the form of a drum is telescopically received. The hub portion 38 is suitably keyed to the pulley half 30 so as to prevent relative rotation therebetween while permitting relative axial movement therebetween. The inner end of the hub portion 38 on the movable pulley half 40 is closed by an annulus 42 suitably attached to the hub 38, the annulus being slidably mounted on the hub 26. The outer end of the drum 40 is closed by an annulus 44 suitably attached to the drum 40 and a ring 46 attached to the annulus 44. A flanged annulus 48 circumscribes a portion of the drum 40, the annulus 48 being suitably attached to a stationary support, not shown, and containing an electric heating element 50.

When the variable diameter pulley assembly is utilized to drive a blower, as shown in the illustration of Figure 1, the heating element 50 is energized through the contacts of a room thermostat. However, the control circuit for the electric heating element constitutes no part of this invention, and suffice it to say that the only purpose of the heating element 50 is to supply heat for controlling the diameter of the pulley assembly.

The ring 46 is slidably supported on an annulus 52 which is attached to the hub 26. The hub 26 is formed with an external shoulder 54. An annulus 56 suitably keyed to the hub 26 so as to rotate therewith although movable axially relative thereto, is normally maintained in engagement with the shoulder 54 by a coiled compression spring 58, one end of which engages the annulus 52 and the other end of which engages the inwardly flanged end of an annulus 60 which is attached to the annulus 56. The inner end of a flexible metallic bellows 62 is attached to the annulus 56, the outer end of the flexible metallic bellows 62 being attached to the annulus 42. The inner end of a larger diameter flexible metallic bellows 64 is attached to the outwardly extending flanged end of an annulus 60, the outer end of the bellows 64 being attached to the ring 46. The chamber formed within the drum 40 is filled with a suitable thermostatic fluid indicated by numeral 66.

Figure 3:
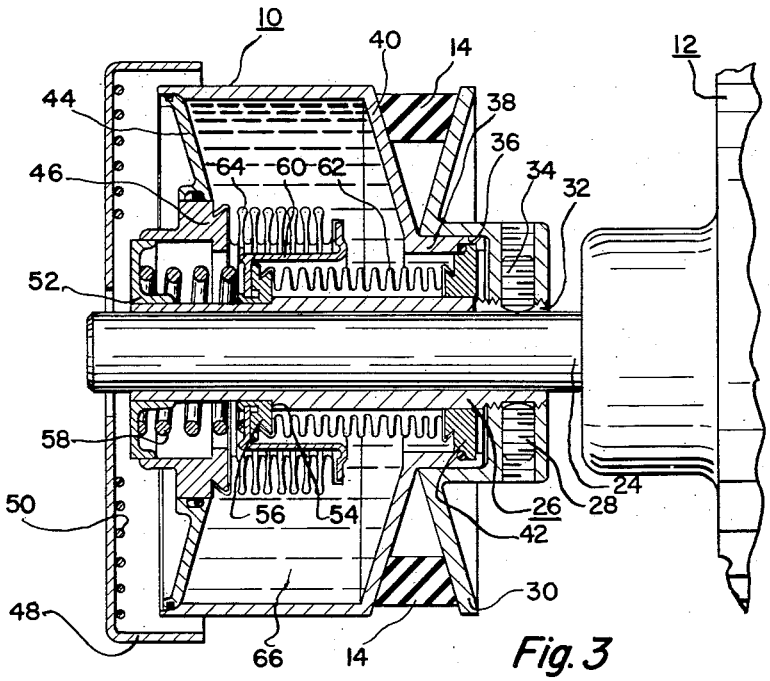
Figure 3 is a fragmentary view, partly in section and partly in elevation, illustrating the pulley assembly in fully closed position.

The thermostatic fluid 66 is sealed within the drum 40 by the bellows 62 and 64. The pulley assembly is shown in substantially the fully open position in Figure 2. Upon energization of the heater 50, or heat from any other suitable source, the fluid 66 expands. The pressure created by expansion of the fluid 66 acts between annulus 42 and annuli 56 and 60. Since the annuli 56 and 60 are normally maintained in engagement with the shoulder 54 by the spring 58, the pressure of the fluid 66 causes movement of the pulley half 40 to the right thereby collapsing the bellows 64 and expanding the bellows 62. Thus, as seen in Figure 3, the pressure created upon expansion of fluid 66 moves pulley half 40 towards the fixed pulley half 30 to increase the pitch diameter of the pulley formed by the halves 30 and 40 to a maximum. The pulley halves 30 and 40 are shown in the fully closed position in Figure 3.

Figure 4:
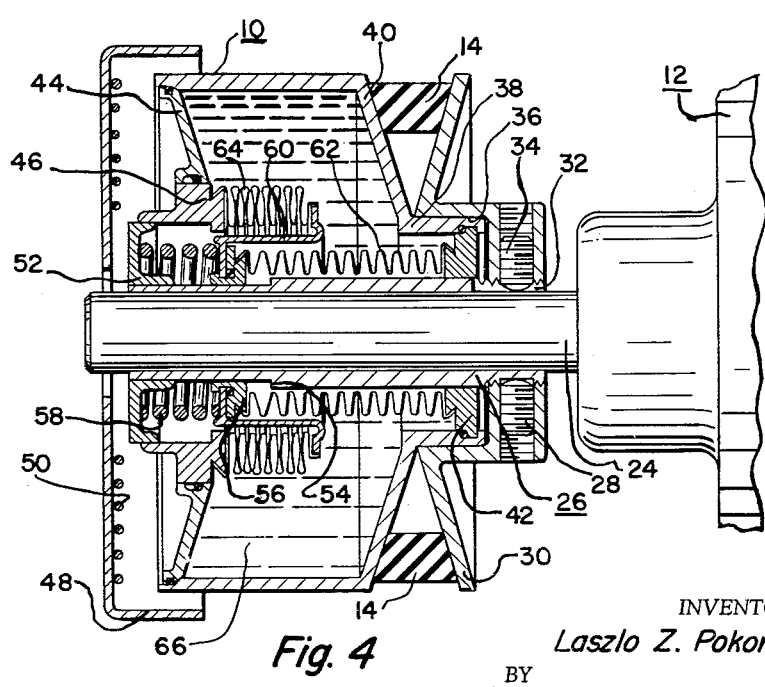
Figure 4 is a view, partly in section and partly in elevation, illustrating the pulley assembly in the fully closed position with the overload spring partially compressed.

If heat should continue to be supplied to the thermostatic fluid 66, it will continue to expand, but since the pulley halves are fully closed the additional movement must be taken up by other means. In the present invention the spring 58 constitutes an overload protection device which enables the bellows 62 to continue to expand even though the pulley halves are fully closed. Thus, if the pulley halves are fully closed, the pressure created by continued expansion of the thermostatic fluid 66 will result in expansion of the bellows 62 and the compression of the bellows 64 by movement of the annulus 56 to the left from the position of Figure 3 to the position of Figure 4, thereby compressing the spring 58. Thus, the pulley assembly of this invention is designed to accommodate over-expansion of the thermostatic fluid when the pulley halves are fully closed without damaging the pulley assembly.

Upon cooling of the thermostatic fluid 66 when the pulley is fully closed, as indicated in Figure 3, the bellows 62 will be collapsed and the bellows 64 expanded, thereby moving the pulley half 40 away from the pulley half 30 from the position of Figure 3 to the position of Figure 2, the force being supplied by the tensioning means for the V-belt 14.

While the embodiment of the invention as herein disclosed constitutes a preferred form, it is to be understood that other forms might be adopted.

What is claimed is as follows:

1. A variable diameter pulley assembly including, a hub, a first pulley half rigidly attached to said hub, a second pulley half rotatable with said hub but movable axially relative thereto, and means including a pair of flexible metallic bellows having their inner ends operatively interconnected and their outer ends attached to said second pulley half to form a sealed chamber within said second pulley half containing a thermostatic fluid, whereby expansion of said fluid will vary the pitch diameter of said pulley.

2. A variable diameter pulley assembly including, a hub, a first pulley half rigidly attached to said hub, a second pulley half rotatable with said hub but movable axially relative thereto, means including a pair of flexible metallic bellows having their inner ends operativey interconnected and their outer ends attached to said second pulley half to form a sealed chamber within said second pulley half containing a thermostatic fluid whereby expansion of said fluid will vary the pitch diameter of said pulley, and resilient means engaging the interconnected inner ends of said bellows so as to be compressed during continued expansion of said thermostatic fluid when the pulley halves are fully closed.

3. A variable diameter pulley assembly including, a hub, a first pulley half rigidly attached to said hub, a second pulley half in the form of a drum rotatable with said hub but movable axially relative thereto, and flexible metallic bellows means extending between both end walls of said drum to form a sealed chamber containing thermostatic fluid whereby expansion of said fluid will vary the pitch diameter of said pulley.

4. A variable diameter pulley assembly including, a hub, a first pulley half rigidly attached to said hub, a second pulley half in the form of a drum rotatable with said hub but movable axially relative thereto, flexible metallic bellows means extending between both end walls of said drum and forming a sealed chamber containing thermostatic fluid whereby expansion of said thermostatic fluid will vary the pitch diameter of said pulley, and resilient means operatively engaging with said bellows means so as to be compressed during continued expansion of the thermostatic fluid when said pulley halves are fully closed.

5. A variable diameter pulley assembly including, a hub, a first pulley half attached to said hub and having a cup-shaped recess, a second pulley half in the form of a drum having a hub portion telescopically received in said cup-shaped recess, said second pulley half being rotatable with said first pulley half but axially movable relative thereto, and flexible metallic bellows means extending between both end walls of said drum and constituting an inner wall of said drum to form a sealed chamber containing thermostatic fluid whereby expnsion of said thermostatic fluid will vary the pitch diameter of said pulley.

6. A thermostatically controlled variable diameter pulley including, a hub, a first pulley half rigidly attached thereto, a second pulley half rotatable with said hub but movable axially relative thereto, said second pulley half being in the form of a drum, and flexible metallic bellows means extending between both end walls of said drum and constituting an inner wall of said drum to form a sealed chamber containing thermostatic fluid whereby expansion of said thermostatic fluid will vary the pitch diameter of said pulley.

7. The pulley assembly set forth in claim 6 wherein said first pulley half is formed with a cup-shaped recess, and wherein said second pulley half is formed with a hub portion telescopically disposed within the cup-shaped recess.

8. The pulley assembly set forth in claim 6 wherein said flexible metallic bellows means includes a first bellows and a second bellows, said bellows having their inner ends operatively interconnected and being of different diameter.

9. The pulley assembly set forth in claim 8 including an annulus connected to rotate with said hub but axially movable relative thereto, and wherein the inner end of the larger diameter bellows and the inner end of the smaller diameter bellows are operatively connected to said annulus, the outer ends of said bellows being connected to the end walls of said drum whereby upon expansion of said thermostatic fluid the larger diameter bellows is collapsed and the smaller diameter bellows is expanded.

10. The pulley assembly set forth in claim 8 including a first annulus connected to rotate with said hub but axially movable relative thereto, a second annulus rigidly attached to said hub but spaced from said first annulus, said hub having an external shoulder, a coiled compression spring disposed between said annuli and normally maintaining said first annulus in engagement with the shoulder on said hub, and wherein the inner end of the larger diameter bellows and the inner end of the smaller diameter bellows are operatively connected with said first annulus, the outer ends of said bellows being connected to the end walls of said drum whereby expansion of said thermostatic fluid will collapse the larger diameter bellows and expand the smaller diameter bellows.

References Cited in the file of this patent
UNITED STATES PATENTS

| | | |
|---|---|---|
| 2,308,507 | Hallinan | Jan. 19, 1943 |
| 2,369,681 | Miles | Feb. 20, 1945 |
| 2,459,378 | Hallinan | Jan. 18, 1949 |
| 2,463,031 | Hallinan | Mar. 1, 1949 |
| 2,658,400 | Dodge | Nov. 10, 1953 |